United States Patent
Oh et al.

(10) Patent No.: US 12,428,003 B2
(45) Date of Patent: Sep. 30, 2025

(54) APPARATUS AND METHOD FOR SEPARATELY ESTIMATING BACKLASH AND COMPLIANCE OF VEHICLE DRIVING SYSTEM

(71) Applicants: Hyundai Motor Company, Seoul (KR); Kia Corporation, Seoul (KR)

(72) Inventors: Ji Won Oh, Hwaseong-si (KR); Jeong Soo Eo, Hwaseong-si (KR); Sang Joon Kim, Seoul (KR); Lee Hyoung Cho, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 115 days.

(21) Appl. No.: 18/436,717

(22) Filed: Feb. 8, 2024

(65) Prior Publication Data

US 2025/0121834 A1   Apr. 17, 2025

(30) Foreign Application Priority Data

Oct. 16, 2023  (KR) .................. 10-2023-0137706

(51) Int. Cl.
*B60W 50/02*   (2012.01)

(52) U.S. Cl.
CPC ... *B60W 50/0205* (2013.01); *B60W 2510/082* (2013.01); *B60W 2510/084* (2013.01); *B60W 2510/1055* (2013.01); *B60W 2520/28* (2013.01)

(58) Field of Classification Search
CPC ......... B60W 50/025; B60W 2510/082; B60W 2510/084; B60W 2510/1055; B60W 2520/28

USPC ........................................................ 701/32.9
See application file for complete search history.

(56) References Cited

U.S. PATENT DOCUMENTS

| | | | |
|---|---|---|---|
| 11,625,959 B2 | 4/2023 | Oh et al. | |
| 11,745,723 B2 | 9/2023 | Oh et al. | |
| 11,807,210 B2* | 11/2023 | Hayasaka | B60W 20/40 |
| 12,227,079 B2* | 2/2025 | Oh | B60L 15/20 |
| 2021/0049843 A1* | 2/2021 | Oh | G07C 5/0808 |
| 2022/0203843 A1 | 6/2022 | Oh et al. | |
| 2024/0181893 A1* | 6/2024 | Oh | B60L 15/20 |
| 2025/0001877 A1* | 1/2025 | Oh | B60L 15/20 |

FOREIGN PATENT DOCUMENTS

| | | |
|---|---|---|
| KR | 10-2021-0020189 | 2/2021 |
| KR | 10-2022-0048144 | 4/2022 |
| KR | 10-2022-0096746 | 7/2022 |

* cited by examiner

*Primary Examiner* — Andrew Joseph Rudy
(74) *Attorney, Agent, or Firm* — Fish & Richardson P.C.

(57) ABSTRACT

An apparatus and a method estimate backlash and compliance. The apparatus and the method are configured to distinguish and determine the backlash and the compliance occurring in a vehicle driving system. The method includes providing information related to a driving system model between a motor and a driving wheel for driving a vehicle to a controller, determining a compliance speed, by the controller, by using the information related to the driving system model based on vehicle driving information acquired by a driving information detector while the vehicle is driven, and determining a backlash speed, by the controller, by subtracting the determined compliance speed from an overall speed difference that is a difference between a motor speed and a driving wheel speed. The apparatus is configured to perform the method.

12 Claims, 3 Drawing Sheets

APPARATUS AND METHOD FOR SEPARATELY ESTIMATING BACKLASH AND COMPLIANCE OF VEHICLE DRIVING SYSTEM

CROSS REFERENCE TO RELATED APPLICATION

The present application claims priority to Korean Patent Application No. 10-2023-0137706, filed on Oct. 16, 2023, the entire contents of which are incorporated herein for all purposes by this reference.

TECHNICAL FIELD

The present disclosure relates to a separation estimation apparatus and a separation estimation method capable of accurately distinguishing and determining backlash and torsion (compliance) that occur in a vehicle driving system.

BACKGROUND

In a vehicle driven by a motor, a damping element, such as a torsional damper which is provided in consideration of backlash and torsional characteristics of a driving system, is insufficient, so that vibration and impact may occur when a direction change of an effective transmission torque occurs in the driving system.

More specifically, in a vehicle driven by a motor, a driving system between a driving wheel and a motor that is a driving source of the vehicle includes various elements that exhibit backlash and torsional characteristics. The various elements include a constant velocity joint part, a driving shift, and a gear device such as a decelerator, and so on.

Therefore, although the driving system from the motor to the driving wheel may be referred to as a rigid body that is rotated as one body, backlash and torsion (compliance) may occur in the driving system between the motor and the driving wheel during an actual driving.

For example, backlash of the driving system may occur in a situation in which a torque direction is rapidly changed, such as a situation in which a driver rapidly presses an accelerator pedal or suddenly releases a foot from the accelerator pedal.

At this time, a Noise, Vibration, and Harshness (NVH) problem may occur in a region where the torque direction is changed due to a tooth space, a gap, a clearance or the like (backlash) between driving system gears and a tooth space, a gap, a clearance or the like between parts in a constant velocity joint. In addition, when torsion of a driving shaft or a mount variation of the driving system occur due to a rapid torque change rate and a high torque, vibration may occur.

As such, when there is a rapid vehicle operation or a rapid driving input of the driver, backlash and compliance may occur in the driving system, so that vibration, impact, and noise may occur.

In a vehicle, securing vehicle behavior responsiveness to driving input by a driver, such as an operation of an accelerator pedal or a brake pedal, and reducing the Noise, Vibration and Harshness (NVH) problem caused by a rapid change in torque conflict with each other.

Therefore, in terms of generation of a command for a vehicle driving source, for example, a motor torque command, to generate an optimal motor torque command to overcome the conflicting relationship described above, gradient restriction and a filter using various conditions as factors are used.

Particularly, in order to relieve a driving system backlash which occurs at a point in time when a direction of torque is changed and which applies impact to a driving shaft and thus affects drivability, control for restricting a rate of change (gradient) in torque according to a section is performed by using a rate limiter and so on.

However, since this is a control that gently limits the rate of change in torque in a section where backlash may occur, a desired torque generation according to a driving input is not capable of being realized, thereby adversely affecting securing of vehicle responsiveness (a decrease in a longitudinal direction responsiveness of the vehicle).

In addition, in this case, there is inconvenience of having to calibrate a restriction value for each section in order to restrict the rate of change (gradient) in torque, and substantial effort to determine conditions in which such a backlash section occurs through tests is performed.

In addition, as a conventional technology, a method of determining a backlash occurrence and a backlash occurrence section based on a difference value between a motor speed and a wheel speed has been proposed. However, according to this method, there is a limitation that it is difficult to distinguish a difference between backlash and compliance of a driving system.

Compliance in the driving system acts as an element that affects a direct connection of a torque transmission while torsion or loosening of a driving shaft having elasticity rather than a rigid body occurs. Such compliance in the driving system has a linear torque transmission characteristic, whereas pure backlash has a nonlinear torque transmission characteristic. Therefore, in order to realize effective torque control for securing a drivability, backlash and compliance may be distinguished from each other and may be handled through different methods.

As an extreme example, when compliance is misjudged as backlash and a torque control for reducing backlash is performed in a compliance section that is not a backlash generation section, a torque compensation control is involved for a long time against the driver's intention, and overall responsiveness of the vehicle is reduced as a result.

When various conditions are additionally applied in order to prevent this situation described above, misjudgment between backlash and compliance may occur frequently, and accuracy of an intervention time and a stopping time of torque correction is also reduced.

In addition, although a method of extracting backlash by using model information has been proposed, there is a problem that accuracy is reduced due to model errors and disturbances.

SUMMARY

Accordingly, the present disclosure has been made keeping in mind the above problems occurring in the related art, and an objective of the present disclosure is to provide an apparatus and a method that are capable of easily and accurately a device and a method capable of easily and accurately detecting and determining backlash and torsion (compliance) that occur in a driving system during a vehicle driving, the apparatus and the method being also capable of reducing complexity of the determination.

In addition, another objective of the present disclosure is to provide an apparatus and a method that are capable of detecting pure backlash and pure compliance separately, thereby being capable of contributing to performing a torque profiling control for securing an effective drivability in the future based on the amount of backlash and the amount of compliance that are estimated separately.

The objectives that can be obtained from the present disclosure are not limited to the above-mentioned objectives, and other objectives not mentioned herein will be clearly understood by those skilled in the art from the following description.

In order to achieve the objectives described above, according to an implementation of the present disclosure, there is provided a method for separately estimating backlash and compliance in a vehicle driving system, the method including: providing information related to a driving system model between a motor and a driving wheel for driving a vehicle to a controller; determining a compliance speed, by the controller, by using the information related to the driving system model based on vehicle driving information acquired by a driving information detector while the vehicle is driven; and determining a backlash speed, by the controller, by subtracting the determined compliance speed from an overall speed difference that is a difference between a motor speed and a driving wheel speed.

Here, in the determining of the compliance speed, the compliance speed may be determined by using a model equation for the compliance as the information related to the driving system model, and the compliance speed may be determined by multiplying a spring constant of the vehicle driving system that is premodeled by a rate of change in a driving system transmission torque that is determined based on the vehicle driving information.

In addition, in the determining of the compliance speed, the compliance speed may be determined by using a model equation for the compliance as the information related to the driving system model, and the compliance speed may be determined by multiplying a spring constant of the vehicle driving system that is premodeled by a rate of change in a motor torque command that is determined based on the vehicle driving information.

In addition, the overall speed difference may be calculated by using the motor speed and the driving wheel speed that are detected by each sensor of the driving information detector, and may be a difference between the driving wheel speed and a speed in which the motor speed is converted to a speed at the driving wheel by using a gear ratio between the motor and the driving wheel or a difference between the motor speed and a speed in which the driving wheel speed is converted to a speed at the motor by using the gear ratio between the motor and the driving wheel.

In addition, in the determining of the compliance speed, the compliance speed may be determined by using the vehicle driving information and an ideal compliance model as the information related to the driving system model of the vehicle, in which the ideal compliance model assumes there is no backlash in a driving system.

Here, a model equation of an observer described below may be used as an equation of the ideal compliance model.

observer: $\begin{cases} \dot{\hat{\theta}}_c = \omega_{c,meas} + \underbrace{K_p\left(\dfrac{T_{in}}{k_{spr}} - \hat{\theta}_c\right)}_{P-term} + \underbrace{K_I \int\left(\dfrac{T_{in}}{k_{spr}} - \hat{\theta}_c\right)dt}_{I-term} \\ \hat{\omega}_{backlash} = -K_p\left(\dfrac{T_{in}}{k_{spr}} - \hat{\theta}_c\right) \\ \hat{\omega}_c = \dot{\hat{\theta}}_c \end{cases}$ Equation Where each $\begin{cases} \dot{\theta}_c = \omega_c = \omega_m - \omega_w \\ \theta_c = \dfrac{T_{in}}{k_{spr}} \end{cases}$, $\dot{\hat{\theta}}_c$ is the compliance speed, and $\hat{\omega}_{backlash}$ is the backlash speed, $\theta_c$ and $\hat{\omega}_c$ are a compliance angle and a compliance speed, respectively, when it is assumed that there is no backlash, and the compliance angle is expressed as $\theta_c \equiv \theta_m - \theta_w$ and the compliance speed is expressed as $\omega_c \equiv \omega_m - \omega_w$, and $\theta_m$ is a motor rotation angle, $\omega_m$ is the motor speed, $\theta_w$ is a driving wheel rotation angle ($\theta_w = r\theta_{w,\ raw}$, where r is the gear ratio between the motor and the driving wheel, and $\theta_{w,\ raw}$ is an actual driving wheel rotation angle), $\omega_w$ is the driving wheel speed ($\omega_w = r\omega_w$, $r\theta_w$, where $\omega_w$, raw is an actual driving wheel speed), $K_P$ and $K_I$ are a P gain and an I gain, respectively, $T_{in}$ is a motor torque command, $K_{spr}$ is a spring constant of the vehicle driving system that is premodeled, $\omega_{c,\ meas}$ is a difference between a motor speed $\omega_{m,\ meas}$ and a driving wheel speed $\omega_{w,\ meas}$ that are detected by each sensor, and $\hat{\theta}_c$ is a difference in an observation sum angle.

In addition, according to an implementation of the present disclosure, there is provided an apparatus for separately estimating backlash and compliance in a vehicle driving system, the apparatus including: a driving information detector configured to detect vehicle driving information; and a controller which is configured to acquire the vehicle driving information from the driving information detector and in which information related to a driving system model between a motor and a driving wheel for driving a vehicle is stored. Furthermore, while the vehicle is driven, the controller may be configured to determine a compliance speed by using the information related to the driving system model based on the vehicle driving information acquired by the driving information detector, and may be configured to determine a backlash speed by subtracting the determined compliance speed from an overall speed difference that is a difference between a motor speed and a driving wheel speed.

Therefore, according to the apparatus and method for separately estimating backlash and compliance in the vehicle driving system according to the present disclosure, there are effects that backlash and compliance occurring in the driving system during the vehicle driving may be easily and accurately detected and determined, and the complexity of the determination may be reduced.

In addition, pure backlash and pure torsion may be detected separately and, through this, the torque profiling control for securing effective driving ability in the future may be performed based on the amount of backlash and the amount of compliance that are estimated separately.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Hereinafter, one or more implementations of the present disclosure will be described in detail with reference to the accompanying drawings. Specific structures and functions stated in the implementation of the present disclosure are exemplified to illustrate an implementation according to the spirit of the present disclosure and implementations according to the spirit of the present disclosure can be achieved in various ways. Furthermore, the present disclosure should not be construed as being limited to the following implementations and should be construed as including all changes, equivalents, and replacements included in the spirit and scope of the present disclosure.

The present disclosure relates to an apparatus and a method that are capable of separately detecting and estimating backlash and torsion (compliance) generated in a driving system of a vehicle.

When torque is compensated without distinguishing between backlash and compliance, a compensation effect compared to the torque compensation amount is insufficient, so that compensating torque without distinguishing between backlash and compliance is inefficient. Therefore, a method for separately responding to backlash and compliance respectively by torque compensation and gradient compensation may be performed.

In some implementations, separately determining backlash and compliance and separately estimating the backlash amount and the compliance amount respectively are performed. When the torque compensation and the gradient compensation are respectively performed based on the result of the separate determining and the separate estimating, backlash impact reduction and torsional vibration reduction may be effectively realized.

Figure 1:
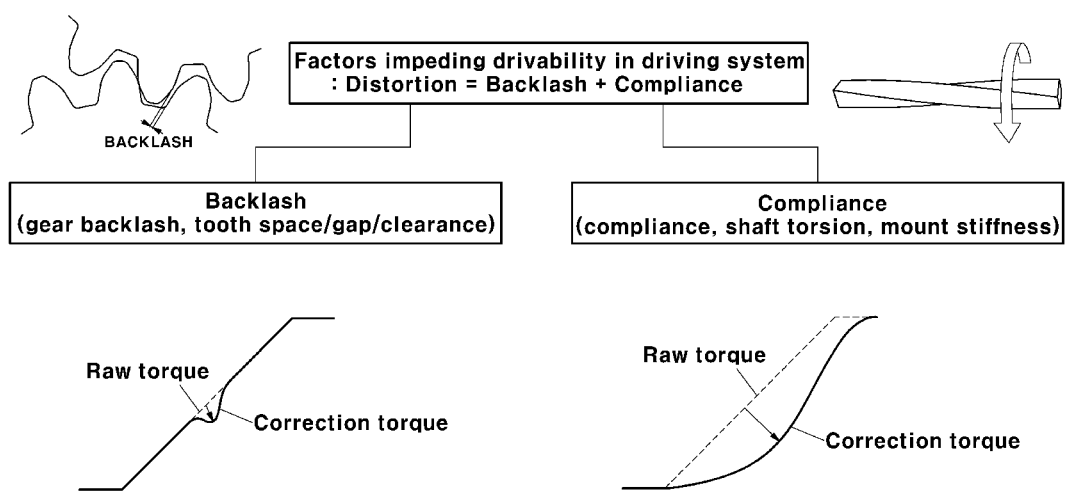
FIG. 1 is a view illustrating a problem that occurs when backlash and torsion (compliance) are not distinguished and are not separated.

FIG. 1 is a view illustrating a problem that occurs when backlash and compliance are not distinguished and are not separated, and factors that impede drivability of a vehicle in a driving system may include backlash and compliance.

In the backlash and the compliance, the backlash includes a tooth space, a gap, a clearance, or the like in driving system components such as a driving system gear, a constant speed joint, and so on. The compliance includes a shaft torsion, a mount variation (a mount stiffness), and so on of the driving system.

The shaft torsion or the mount stiffness that occurs in the driving system while the vehicle is driven may be expressed as compliance, and the terms torsion and compliance are used in the following description in the same meaning.

In the factors that impede the drivability, a problem region where backlash occurs is obvious. That is, there is a torque region in which backlash may occur in the driving system of the vehicle, and such a torque region (a backlash region) may be limited to a torque range between a lower limit value that is a negative value and an upper limit value that is a positive value.

If a direction of motor torque is changed according to a driver's driving input, zero-crossing in which the motor torque passes through zero torque is unavoidable, and one-time impact and noise caused by backlash occur during the zero-crossing of the torque. Such backlash can be counteracted with compensation that reduces the motor torque in a problem region where the backlash may occur.

In some examples, in the case of compliance, a problem may occur in the entire torque region, and compliance induces vibrational shaking. The compliance may be reduced by limiting a gradient of a motor torque, and the vibrational shaking may be reduced by using an anti-jerk control and hardware damping characteristics.

However, the response methods for reducing backlash and compliance as described above are proposed to respond to backlash and torsion respectively based on a pure backlash value and a pure torsion value that are separately extracted and estimated. In some examples, according to the response methods, since a correction that reduces torque is used for backlash and a correction that limits a torque gradient is used for compliance such as shaft torsion and so on, accurate and effective response can be realized when a separated extraction and estimation of backlash and compliance is premised.

When the motor torque is reduced or the gradient of the motor torque is limited in the problem region (the backlash region) in order to reduce the backlash impact, a problem in which the responsiveness of a longitudinal movement of the vehicle is reduced occurs. Furthermore, when the motor torque is rapidly changed to secure the responsiveness equal to the driving input, impact and noise caused by backlash may occur.

In order to solve problems caused by backlash and compliance at the same time, differentiating the torque gradient for each section in which the backlash impact noise is generated may be considered, but this may cause a problem of damaging the linearity of vehicle acceleration and deceleration.

Therefore, after backlash and compliance are separately extracted and estimated, correcting a torque shape for each element and then deriving a torque command are performed, and then an integration between a functional torque profile and a correction torque profile is performed.

Hereinafter, the separation estimation apparatus and the separation estimation method according to an implementation of the present disclosure will be described in detail with reference to the drawings.

Figure 2:
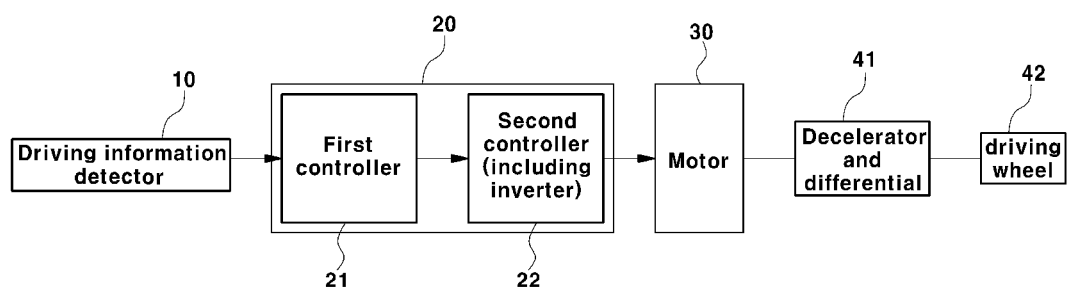
FIG. 2 is a block diagram illustrating an example of a driving system and a driving system torque control system of a vehicle.

FIG. 2 is a block diagram illustrating a driving system and a driving system torque control system of a vehicle to which the present disclosure is applied. As illustrated in the drawing, the present disclosure may be applied to an electric vehicle in which a motor 30 that is a driving device configured to drive the vehicle is mounted. Typically, a battery is connected to the motor 30 via an inverter such that the battery is capable of being charged and discharged.

The motor 30 is connected to a driving wheel 42 such that the motor 30 is capable of transmitting a power to the driving wheel 42. Torque output from the motor 30 may be transmitted to the driving wheel 42 through driving system elements such as a decelerator and a differential 41, a driving shaft, a vehicle shaft, and so on. Conversely, torque of the driving wheel 42 may be transmitted to the motor 30 through the driving system elements. In such a driving system, backlash and compliance may occur while the vehicle is driven.

In the electric vehicle, the operation (driving and regenerating) of the motor 30 is controlled according to a torque command generated by a controller 20. The controller 20 determines a required torque according to a vehicle driving state, and generates a final torque command based on the required torque.

The final torque command is a motor torque command, and the controller 20 controls the operation of the motor 30 through the inverter based on the final torque command. Generally, when the torque command is a positive value, the torque command is a driving torque command that accelerates the vehicle.

Furthermore, when the torque command is a negative value, the torque command is a regenerative torque command that decelerates the vehicle.

The controller 20 may include a first controller 21 configured to determine a required torque for driving the vehicle based on a driver's driving input value or receive the required torque from another controller such as an Advanced Driver Assistance System (ADAS) controller, and to generate and output a torque command based on the required torque, and may include a second controller 22 configured to control the operation of the motor 30 according to a final torque command input from the first controller 21.

The first controller 21 may be a Vehicle Control Unit (VCU) that determines and generates a torque command required for driving the vehicle in a typical vehicle. Detailed description of the method and the process of determining the torque command in the vehicle will be omitted since the method and the process are well-known technical matters in the relevant technical field.

When the first controller 21 generates and outputs a torque command, the second controller 22 receives the torque command and controls the operation of the motor 30 through the inverter. Accordingly, the torque output from the motor 30 is applied to the driving wheel 42 through the decelerator and the differential 41 of the driving system.

The second controller 22 may be a conventional Motor Control Unit (MCU) that controls the operation of the motor 30 through the inverter according to the torque command output from the VCU in the electric vehicle.

In the description above, the controlling subject is described as the first controller 21 and the second controller 22. However, in the present specification, the controlling subject will be collectively referred to as the controller, and the controller may be set such that the controller performs a backlash and torsion separation estimation process according to the present disclosure.

In the present disclosure, vehicle driving information such as a driver's driving input value and so on input to the controller 20 is information indicating a vehicle driving state, and the vehicle driving information may include sensor detection information which is detected by a driving information detector 10 and which is input to the controller 20 through a vehicle network.

At this time, the driving information detector 10 may include an Accelerator Pedal Sensor (APS) configured to detect an accelerator pedal input value (an APS value, %) of the driver, a Brake pedal Position Sensor (BPS) configured to detect a brake pedal input value (a BPS value, %), a sensor configured to detect a driving system speed, and a sensor for detecting a vehicle speed.

Here, the driving system speed may be a rotation speed of the motor 30 that is the driving device, or may be a rotation speed (a wheel speed) of the driving wheel 42. At this time, the sensor detecting the driving system speed may be a sensor configured to detect the rotation speed of the motor 30, and may be a conventional resolver detecting a rotor position of the motor 30. Alternatively, the sensor detecting the driving system speed may be a conventional wheel speed sensor detecting the rotation speed (the wheel speed) of the driving wheel 42.

In addition, the sensor for detecting the vehicle speed may also be the wheel speed sensor. It is a well-known technology to those skilled in the art that the vehicle speed information can be acquired from a signal of the wheel speed sensor, so that the detailed description thereof will be omitted.

As the vehicle driving information for determining the required torque and for generating the torque command in the controller 20, the accelerator pedal input value (the APS value, %) of the driver, the brake pedal input value (the BPS value, %) of the driver, the rotation speed of the motor 30, the rotation speed of the driving wheel 42, and the vehicle speed that are detected by the driving information detector 10 may be selectively used.

In the vehicle driving information described above, the accelerator pedal input value (the APS value) and the brake pedal input value (the BPS value) may be referred to as driving input information of the driver. Furthermore, the rotation speed of the motor 30, the rotation speed of the driving wheel 42, and the vehicle speed may be referred to as vehicle state information.

In addition, in a broad sense, the vehicle driving information may include information determined by the controller 20, or may include information (for example, required torque information) input to the controller 20 through the vehicle network from another controller (for example, the ADAS controller) in the vehicle.

In the present disclosure, two methods of separating and estimating backlash and compliance such as shaft torsion in real time are proposed.

The first method is a method in which a compliance speed (that is, a torsional speed) is first calculated by using a model equation for compliance and then a pure backlash speed is acquired by subtracting the compliance speed from the overall speed difference.

To this end, information related to a driving system model between the motor 30 and the driving wheel 42 for driving the vehicle is provided to the controller 20, and the controller 20 calculates the compliance speed by using the model equation for compliance of the driving model-related information based on the vehicle driving information acquired by the driving information detector 10, and then the pure backlash speed is acquired by subtracting the compliance speed from the overall speed difference d.

In calculating the compliance speed by using the simplified model in the present disclosure, the compliance speed may be acquired by multiplying a spring constant of the vehicle driving system that is premodeled by a rate of change in transmission torque determined based on driving system state information among the vehicle driving information.

Figure 3:
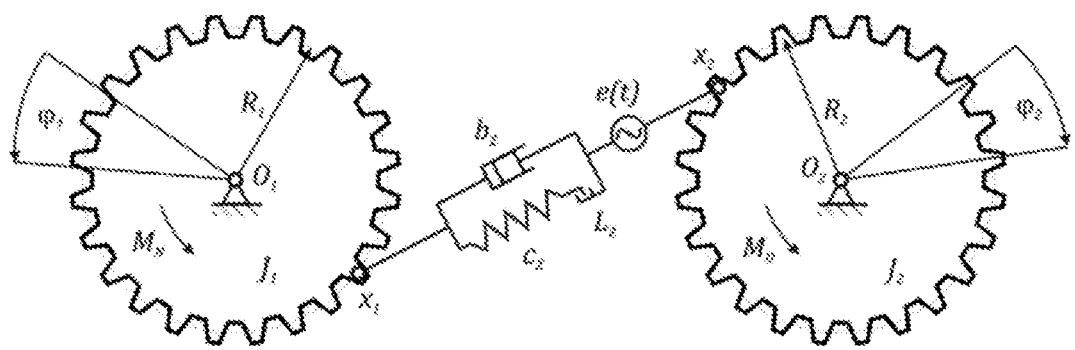
FIG. 3 is a view illustrating an example of a driving system gear model.

The transmission torque may be acquired by the driving system model. FIG. 3 is a view illustrating an example of a driving gear model in the present disclosure [Prajapat, Ganesh P., N. Senroy, and I. N. Kar. "Modeling and impact of gear train backlash on performance of DFIG wind turbine system." Electric Power Systems Research 163 (2018): 356-364.].

Figure 4:
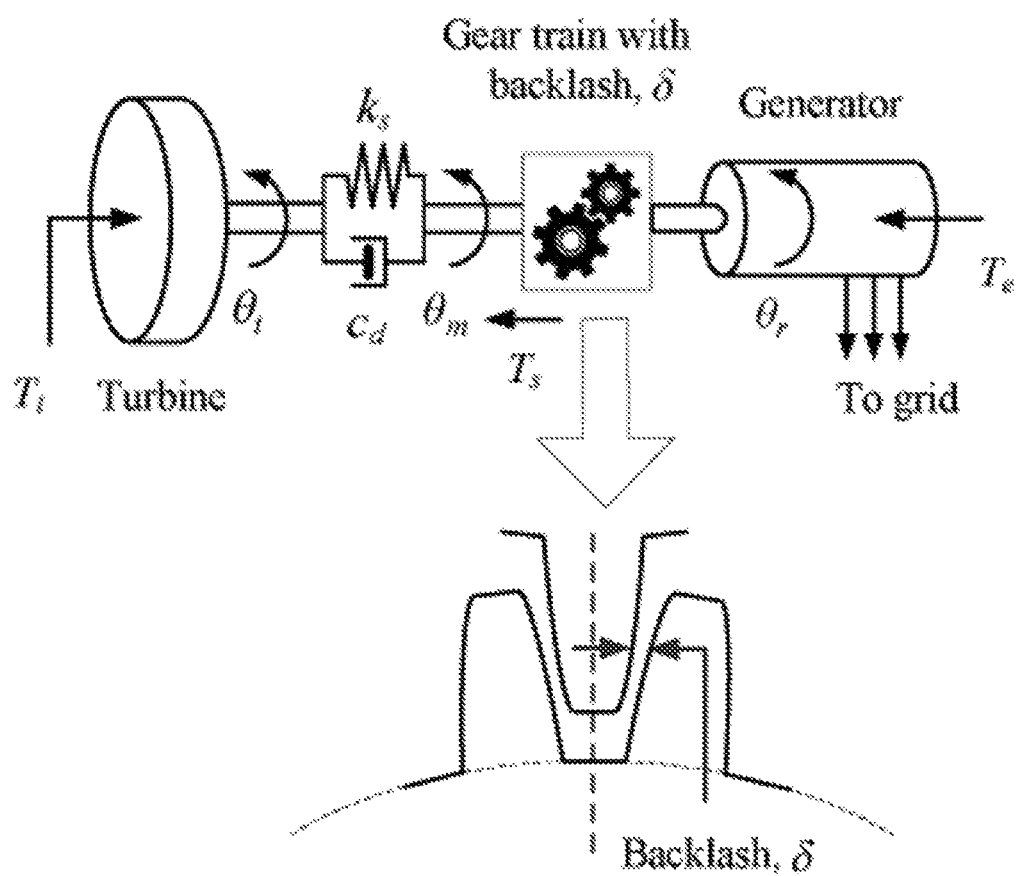
FIG. 4 is a view illustrating an example of a drive shaft torsion model.

In addition, FIG. 4 is a view illustrating an example of a drive shaft torsion model in the present disclosure [Margielewicz, Jerzy, Damian Ga ska, and Grzegorz Litak. "Modelling of the gear backlash." Nonlinear Dynamics 97.1 (2019): 355-368.].

In the present disclosure, the driving gear model illustrated in FIG. 3 or the drive shaft torsion model illustrated in FIG. 4 may be used as a driving system model for determining the transmission torque that is an output torque from an input torque. Generally, as illustrated in FIG. 3 and FIG. 4, the driving system model considers stiffness or damping existing between connecting parts of gears, and considers backlash that exists in between.

The driving system state information may include an input torque applied to the driving system, a rotation speed of a driving input unit, and a rotation speed of a driving output unit. Furthermore, the rotation speed of the driving input unit is a rotation speed of a motor, and the rotation speed of the driving output unit is a rotation speed of a driving wheel.

The input torque refers to a torque of a torque source which generates the torque for driving the vehicle and which applies the torque to the driving system. At this time, a command value may be used as the input torque.

The main torque source is a driving device for driving the vehicle, and the driving device that is the main torque source in the electric vehicle is the motor, so that the command may be a motor torque command (a final torque command) as an input torque command. At this time, the input torque may be determined based on vehicle driving information.

The transmission torque transmitted between the gears may be estimated by using information such as the input torque command (the motor torque command), the rotation speed of the driving system input unit, the rotation speed of the driving system output unit, and so on based on the driving system model described above. Furthermore, the compliance speed may be determined based on the change rate of the estimated transmission torque.

In the present disclosure, the transmission torque may refer to a torque transmitted from a rear end (an output side) of compliance elements when it is assumed that the compliance elements are combined with each other in the driving system and the compliance elements are present in one place.

Under an assumption that backlash is not considered, the models in FIG. 3 and FIG. 4 may be used as the driving system model for acquiring the transmission torque in the present disclosure, and may be used as the driving system model for inducing the compliance model equation.

Alternatively, the compliance speed may be acquired by multiplying the spring constant by the torque command that is the driving system control command determined based on the vehicle driving information, in which the torque command is a slope (a derivative of the command value) of the motor torque command.

The overall speed difference is the difference between the motor speed and the driving wheel speed. Here, the motor speed and the driving wheel speed (the wheel speed) are the rotation speed of the motor 30 and the rotation speed of the driving wheel 42 that are detected by each sensor of the driving information detector 10.

Of course, it is assumed that the difference between the motor speed and the driving wheel speed is in a state in which a difference due to a reduction gear ratio or a gear ratio has already been corrected. That is, the speed difference between the motor and the driving wheel may be a difference between the motor speed and a speed in which the driving wheel speed is converted to a speed at the motor by using the reduction gear ratio or the gear ratio between the motor and the driving wheel. Alternatively, the speed difference between the motor and the driving wheel may be a difference between the driving wheel speed and a speed in which the motor speed is converted to a speed at the driving wheel by using the reduction gear ratio or the gear ratio.

In addition, the overall speed difference may be understood as a sum of the backlash speed and the compliance speed. Therefore, the pure backlash speed may be acquired by subtracting the calculated compliance speed from the overall speed difference. In this manner, it is possible to separately estimate backlash and compliance (torsion) in real time.

The second method is a method of using an ideal compliance (torsion) model and using a measured speed difference between a motor and a driving wheel. Furthermore, in the ideal compliance model, it is assumed that there is no backlash in the driving system. In the description below, "the measured speed difference between the motor and the driving wheel" is a difference between a motor speed and a driving wheel speed that are detected by the sensor of the driving information detector 10.

Since the model is constructed assuming that there is no backlash, an error occurs between a model value and an actual value when a speed difference between a motor and a driving wheel acquired from a driving system plant in which backlash actually exists is substituted into the model.

Since this error is likely to be an error caused by backlash that is intentionally not implemented in the model, the corresponding error value may be defined as a pure backlash speed. Therefore, a pure compliance speed may be acquired by subtracting the calculated backlash speed from the speed difference (that is, the overall speed difference) between the motor and the driving wheel measured in real time.

In the method described above, the speed difference between the motor and the driving wheel measured in real time is acquired, and a model value is acquired from the model at the same time, so that setting information designed in the form of an observer may be used.

That is, an observation value finally acquired through the model is a difference in an observation sum speed, and a method of acquiring the difference is summing a feedback term value and the measured speed difference between the motor and the driving wheel. Here, the feedback term value may be acquired by a function of a difference value between a difference in a model angle and a difference in an observation sum angle.

The difference in the observation sum angle may be acquired by integrating the difference in the observation sum speed acquired as a final result from the observer, and the difference in the model angle may be acquired by multiplying the torque command by a reciprocal of the spring constant that is predetermined.

According to this method, a differentiator in the first method that is described above may be deleted, robustness against noise may be secured, and robustness against the model error such as the reduction gear ratio may be additionally secured by converging to the feedback term.

An implementation of designing such an observer is as follows.

First, when a motor rotation angle (a motor angle) is set to $\theta_m$, a motor speed (a rotation speed) is set to $\omega_m$, a driving wheel rotation angle (a wheel angle) is set to $\theta_w$, and a driving wheel speed (a wheel speed) is set to $\omega_w$, the wheel angle $\theta_w$ converted to a rotation angle at the motor by using a gear ratio r may be expressed as a value acquired by multiplying an actual driving wheel rotation angle $\theta_{w,\,raw}$ before conversion by the gear ratio r (that is, $\theta_w = r\theta_{w,\,raw}$).

Similarly, the driving wheel speed $\omega_w$ converted to a speed at the motor by using the gear ratio r may be expressed as a value acquired by multiplying an actual driving wheel speed $\omega_{w,raw}$ before conversion by the gear ratio r (that is, $\omega_w = r\omega_{w,\,raw}$).

In addition, when it is assumed that there is no backlash, a compliance angle $\theta_c$ may be expressed as an angle difference between the motor and the driving wheel (that is, $\theta_c \equiv \theta_m - \theta_w$), and a compliance speed We may be expressed as a speed difference between the motor and the driving wheel (that is, $\omega_c \equiv \omega_m - \omega_w$).

In addition, an observer model as the ideal compliance model assuming that there is no backlash is illustrated as follows. As described below, error factors are observed by using a model in which backlash is intentionally not considered.

perfectly backlashless model: $\begin{cases} \dot{\theta}_c = \omega_c = \omega_m - \omega_w \\ \theta_c = \dfrac{T_{in}}{k_{spr}} \end{cases}$ ↕ difference actual plant: $\dot{\theta}_c \neq (\omega_{c,meas} = \omega_{m,meas} - \omega_{w,meas})$ instead, $\dot{\theta}_c = \omega_{m,meas} - \omega_{w,meas} - \omega_{backlash}$ observer: $\begin{cases} \dot{\hat{\theta}}_c = \omega_{c,meas} + \underbrace{K_p\left(\dfrac{T_{in}}{k_{spr}} - \hat{\theta}_c\right)}_{P-term} + \underbrace{K_I \int\left(\dfrac{T_{in}}{k_{spr}} - \hat{\theta}_c\right)dt}_{I-term} \\ \hat{\omega}_{backlash} = -K_p\left(\dfrac{T_{in}}{k_{spr}} - \hat{\theta}_c\right): \text{P-term error serves} \\ \qquad\qquad\qquad\qquad\qquad \text{as unmodeled backlash speed} \\ \hat{\omega}_c = \dot{\hat{\theta}}_c: \text{backlash eliminated} \end{cases}$ In the equation described above, $K_P$ and $K_I$ represent a P gain and an I gain, respectively.

As can be seen from the equation described above, in the model assuming that there is no backlash, the compliance speed ($\dot{\theta}_c = \omega c$) may be expressed as the speed difference ($\omega_m - \omega_w$) between the motor and the driving wheel, and the compliance angle $\theta_c$ may be expressed as a value acquired by multiplying a reciprocal of a spring constant $K_{spr}$ of a premodeled vehicle driving system by a torque command $T_{in}$ that is a motor torque command.

However, in an actual driving system plant in which backlash and compliance are present together, the compliance speed $\dot{\theta}_c$ is different from the measured speed difference between the motor and the driving wheel. That is, the compliance speed $\dot{\theta}_c$ is different from a difference between a motor speed $\omega_{m,\ meas}$ measured by a sensor and a driving wheel speed $\omega_{w,\ meas}$ measured by a sensor, and the compliance speed $\dot{\theta}_c$ is a value acquired by subtracting a backlash speed from the speed difference ($\omega_{c,\ meas} = \omega_{m,\ meas} - \omega_{w,\ meas}$) between the motor and the driving wheel (that is, the speed difference between the motor and the driving wheel is the sum of the compliance speed and the backlash speed).

In the observer model described above, which is the ideal compliance model without backlash, $\dot{\hat{\theta}}_c$ is the difference in the observation sum speed, $\omega_{c,\ meas}$ is the measured speed difference (the speed difference between the motor and the driving wheel, $\omega_{c,\ meas} = \omega_{m,\ meas} - \omega_{w,\ meas}$), $$\dfrac{T_{in}}{k_{spr}}$$

is a model angle difference, and $\hat{\theta}_c$ is a difference in an observation sum angle.

In addition, since $\hat{\omega}_{backlash}$ is a pure backlash speed to be estimated and the model assumes that there is no backlash, the difference in the observation sum speed of the observer model is a compliance speed to be estimated. That is, the compliance speed to be estimated is a pure compliance speed $\hat{\omega}_c = \dot{\hat{\theta}}_c$ in which the backlash speed is subtracted.

In addition, in the ideal compliance model without backlash, $\omega_{c,\ meas}$ is a feedforward term. Furthermore, in the model equation, a P-term and an I-term are feedback terms.

Since the observer model is the ideal compliance model constructed assuming that there is no backlash, an error occurs between the model value and the actual value when the measured speed difference between the motor and the driving wheel in the driving system plant in which backlash actually exists is substituted into such a model.

Since this error is caused by backlash that is intentionally not implemented in the model, the corresponding error value may be defined as the pure backlash speed $\hat{\omega}_{backlash}$. Therefore, the pure compliance speed $\hat{\omega}_c = \dot{\hat{\theta}}_c$ may be acquired by subtracting the calculated backlash speed $\hat{\omega}_{backlash}$ from the speed difference $\omega_c$, meas between the motor and the driving wheel measured in real time.

The observation value $\hat{\theta}_c$ finally acquired through the model is a difference in the observation sum speed, and a method of acquiring the difference is summing the feedback term values and the measured speed difference ($\omega_{c,\ meas}$, the feedforward term) between the motor and the driving wheel. Here, the feedback term values may be acquired a function of a difference value between the difference in the model angle $$\dfrac{T_{in}}{k_{spr}}$$

and the difference in the observation sum angle $\hat{\theta}_c$.

The difference in the observation sum angle $\hat{\theta}_c$ may be acquired by integrating the difference in the observation sum speed $\dot{\hat{\theta}}_c$ acquired as a final result from the observer, and the difference in the model angle $$\dfrac{T_{in}}{k_{spr}}$$

may be acquired by multiplying the torque command $T_{in}$ by the reciprocal of the spring constant $K_{spr}$ that is predetermined.

In the present disclosure, the pure backlash amount, which is the pure backlash speed, is estimated based on the actually measured speed difference between the motor and the driving wheel by using the ideal compliance model without backlash.

At this time, a linear spring model may be used as the ideal compliance model, a linear spring model value may be defined as a pure compliance speed, and a value acquired by subtracting the pure compliance speed from the actually measured speed difference between the motor and the driving wheel may be defined as a pure backlash value.

Alternatively, the measured speed difference between the motor and the driving wheel in the ideal compliance model may be used. Furthermore, when the compliance speed model is constructed, the measured speed difference between the motor and the driving wheel may be used as a feedforward term, and the angle difference acquired based on the linear spring model and the angle difference acquired by integrating the compliance speed model may be used as feedback terms.

At this time, a proportional error feedback term is formed by multiplying the feedback term by a gain, and the proportional error feedback term may be added and used in the compliance model.

In addition, the proportion error feedback term is formed by multiplying the feedback term by the gain, an integral error feedback term is formed by multiplying the feedback term by a gain, and the proportional error feedback term and the integral error feedback term may be added and used in the compliance model.

In addition, a value acquired by multiplying the proportional error feedback term by an appropriate sign may be determined as a pure backlash speed, or a value acquired by multiplying the summed value of the proportional error feedback term and the integral error feedback term by an appropriate sign may be defined as a pure backlash speed. Alternatively, a value acquired by multiplying the integral error feedback term by an appropriate sign may be defined as a pure backlash speed.

Here, the reason for multiplying the appropriate sign is that the sign of the backlash speed may be different according to whether a value acquired by subtracting a physical amount of a wheel side from a physical amount of a motor side is defined as a positive direction backlash or a negative direction backlash.

In addition, a value acquired by subtracting the pure backlash speed from the measured speed difference between the motor and the driving wheel may be determined as the pure compliance speed. Here, it is assumed that the difference value between the motor speed and the driving wheel speed is a value in which the difference due to the reduction gear ratio or the gear ratio has already been corrected.

Although the implementations of the present disclosure have been described in detail, the scope of the prevent disclosure is not limited to these implementations, and various modifications and improvements devised by those skilled in the art using the fundamental concept of the present disclosure, which is defined by the appended claims, further fall within the scope of the present disclosure.

What is claimed is:

1. A method for estimating backlash and compliance in a vehicle driving system, the method comprising:
   providing, to a controller, information related to a driving system model between a motor and a driving wheel for driving a vehicle;
   determining, by the controller, a compliance speed based on (i) the information related to the driving system model and (ii) vehicle driving information acquired by a driving information detector while the vehicle is driven; and
   determining, by the controller, a backlash speed by subtracting the determined compliance speed from an overall speed difference, the overall speed difference being a difference between a motor speed and a driving wheel speed.

2. The method of claim 1, wherein determining the compliance speed comprises:
   using a model equation for the compliance as the information related to the driving system model;
   determining a rate of change of a driving system transmission torque based on the vehicle driving information; and
   multiplying a spring constant of the vehicle driving system that is premodeled by the rate of change of the driving system transmission torque.

3. The method of claim 1, wherein determining the compliance speed comprises:
   using a model equation for the compliance as the information related to the driving system model;
   determining a rate of change of a motor torque command based on the vehicle driving information; and
   multiplying a spring constant of the vehicle driving system that is premodeled by the rate of change of the motor torque command.

4. The method of claim 1, further comprising calculating the overall speed difference by using the motor speed and the driving wheel speed that are detected by respective sensors of the driving information detector,
   wherein the overall speed difference is (i) a difference between the driving wheel speed and a converted speed determined by converting the motor speed to a speed at the driving wheel based on a gear ratio between the motor and the driving wheel, or (ii) a difference between the motor speed and a converted speed determined by converting the driving wheel speed to a speed at the motor based on the gear ratio between the motor and the driving wheel.

5. The method of claim 1, wherein determining the compliance speed comprises:
   using the vehicle driving information and an ideal compliance model as the information related to the driving system model of the vehicle, and
   wherein the ideal compliance model is determined assuming no backlash in a driving system.

6. The method of claim 5, wherein the ideal compliance model comprises a model equation of an observer described below:

$$\text{observer:} \begin{cases} \dot{\hat{\theta}}_c = \omega_{c,meas} + K_p\left(\dfrac{T_{in}}{k_{spr}} - \hat{\theta}_c\right) + K_I \int \left(\dfrac{T_{in}}{k_{spr}} - \hat{\theta}_c\right) dt \\ \hat{\omega}_{backlash} = -K_p\left(\dfrac{T_{in}}{k_{spr}} - \hat{\theta}_c\right) \\ \hat{\omega}_c = \dot{\hat{\theta}}_c \end{cases},$$

$$\text{where each } \begin{cases} \dot{\theta}_c = \omega_c = \omega_m - \omega_w \\ \theta_c = \dfrac{T_{in}}{k_{spr}} \end{cases},$$

$\dot{\hat{\theta}}_c$ is the compliance speed, and $\hat{\omega}_{backlash}$ is the backlash speed, $\theta_c$ and $\omega_c$ are a compliance angle and the compliance speed, respectively, assuming no backlash, and the compliance angle is expressed as $\theta_c \equiv \theta_m - \theta_w$, and the compliance speed is expressed as $\omega_c \equiv \omega_m - \omega_w$, and $\theta_m$ is a motor rotation angle, $\omega_m$ is the motor speed, $\theta_w$ is a driving wheel rotation angle ($\theta_w = r\theta_{w,\,raw}$, where r is a gear ratio between the motor and the driving wheel, and $\theta_{w,\,raw}$ is an actual driving wheel rotation angle), $\omega_w$ is the driving wheel speed ($\omega_w = r\omega_{w,\,raw}$ where $\omega_{w,\,raw}$ is an actual driving wheel speed), $K_P$ and $K_I$ are a P gain and an I gain, respectively, $T_{in}$ is a motor torque command, $K_{spr}$ is a spring constant of the vehicle driving system that is premodeled, $\omega_{c,\,meas}$ is a difference between a motor speed $\omega_{m,\,meas}$ and a driving wheel speed $\omega_{w,\,meas}$ that are detected by respective sensors, and $\hat{\theta}_c$ is a difference in an observation sum angle.

7. An apparatus for estimating backlash and compliance in a vehicle driving system, the apparatus comprising:
   a driving information detector configured to detect vehicle driving information; and a controller configured to acquire the vehicle driving information from the driving information detector and to store information related to a driving system model between a motor and a driving wheel for driving a vehicle, wherein the controller is configured to:
while the vehicle is driven, determine a compliance speed based on (i) the information related to the driving system model and (ii) the vehicle driving information acquired by the driving information detector, and determine a backlash speed by subtracting the determined compliance speed from an overall speed difference, the overall speed difference being a difference between a motor speed and a driving wheel speed.

8. The apparatus of claim 7, wherein the controller is configured to determine the compliance speed by:
using a model equation for the compliance as the information related to the driving system model;
determining a rate of change of a driving system transmission torque based on the vehicle driving information; and
multiplying a spring constant of the vehicle driving system that is premodeled by the rate of change of the driving system transmission torque.

9. The apparatus of claim 7, wherein the controller is configured to determine the compliance speed by:
using a model equation for the compliance as the information related to the driving system model;
determining a rate of change of a motor torque command based on the vehicle driving information; and
multiplying a spring constant of the vehicle driving system that is premodeled by the rate of change of the motor torque command.

10. The apparatus of claim 7, wherein the driving information detector comprises sensors configured to detect the motor speed and the driving wheel speed, respectively,
wherein the controller is configured to calculate the overall speed difference by using the motor speed and the driving wheel speed that are detected by the sensors of the driving information detector, and
wherein the overall speed difference is (i) a difference between the driving wheel speed and a converted speed determined by converting the motor speed to a speed at the driving wheel based on a gear ratio between the motor and the driving wheel, or (ii) a difference between the motor speed and a converted speed determined by converting the driving wheel speed to a speed at the motor based on the gear ratio between the motor and the driving wheel.

11. The apparatus of claim 7, wherein the controller is configured to determine the compliance speed by using the vehicle driving information and an ideal compliance model as the information related to the driving system model of the vehicle, the ideal compliance model being determined assuming no backlash in a driving system.

12. The apparatus of claim 11, wherein the ideal compliance model comprises a model equation of an observer described below:

$$\text{observer:} \begin{cases} \dot{\hat{\theta}}_c = \omega_{c,meas} + K_P\left(\frac{T_{in}}{k_{spr}} - \hat{\theta}_c\right) + K_I \int\left(\frac{T_{in}}{k_{spr}} - \hat{\theta}_c\right)dt \\ \hat{\omega}_{backlash} = -K_P\left(\frac{T_{in}}{k_{spr}} - \hat{\theta}_c\right) \\ \hat{\omega}_c = \dot{\hat{\theta}}_c \end{cases},$$

$$\text{where each} \begin{cases} \dot{\theta}_c = \omega_c = \omega_m - \omega_w \\ \theta_c = \frac{T_{in}}{k_{spr}} \end{cases},$$

$\dot{\hat{\theta}}_c$ is the compliance speed, and $\hat{\omega}_{backlash}$ is the backlash speed, $\theta_c$ and $\omega_c$ are a compliance angle and the compliance speed, respectively, assuming no backlash, and the compliance angle is expressed as $\theta_c \equiv \theta_m - \theta_w$ and the compliance speed is expressed as $\omega_c \equiv \omega_m - \omega_w$, and $\theta_m$ is a motor rotation angle, $\omega_m$ is the motor speed, $\theta_w$ is a driving wheel rotation angle ($\theta_w = r\theta_{w,\ raw}$ where r is a gear ratio between the motor and the driving wheel, and $\theta_{w,\ raw}$ is an actual driving wheel rotation angle), $\omega_w$ is the driving wheel speed ($\omega_w = r\omega_{w,\ raw}$ where $\omega_{w,\ raw}$ is an actual driving wheel speed), $K_P$ and $K_I$ are a P gain and an I gain, respectively, $T_{in}$ is a motor torque command, $k_{spr}$ is a spring constant of the vehicle driving system that is premodeled, $\omega_{c,\ meas}$ is a difference between a motor speed $\omega_{m,\ meas}$ and a driving wheel speed $\omega_{w,\ meas}$ that are detected by respective sensors, and $\hat{\theta}_c$ is a difference in an observation sum angle.

* * * * *